United States Patent
Hayashikawa et al.

(10) Patent No.: US 7,130,324 B2
(45) Date of Patent: Oct. 31, 2006

(54) AXIAL FLOW TYPE GAS LASER OSCILLATOR

(75) Inventors: Hiroyuki Hayashikawa, Osaka (JP); Hitoshi Hongu, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 237 days.

(21) Appl. No.: 10/500,725

(22) PCT Filed: Sep. 11, 2003

(86) PCT No.: PCT/JP03/11618

§ 371 (c)(1),
(2), (4) Date: Jul. 6, 2004

(87) PCT Pub. No.: WO2004/034526

PCT Pub. Date: Apr. 22, 2004

(65) Prior Publication Data

US 2005/0063442 A1    Mar. 24, 2005

(30) Foreign Application Priority Data

Sep. 19, 2002 (JP) .............................. 2002-272527

(51) Int. Cl.
*H01S 3/223* (2006.01)
*H01S 3/03* (2006.01)

(52) U.S. Cl. .............................. 372/58; 372/59; 372/61

(58) Field of Classification Search ................. 138/37, 138/40–46; 372/59, 58, 61
See application file for complete search history.

(56) References Cited

U.S. PATENT DOCUMENTS

| 3,477,467 A | * | 11/1969 | Sewell et al. | ........... 137/601.19 |
| 4,317,087 A | * | 2/1982 | Sander et al. | ................. 372/57 |
| 4,635,269 A | | 1/1987 | Reilly et al. | |
| 4,771,436 A | * | 9/1988 | Koseki | ........................ 372/58 |
| 4,921,014 A | * | 5/1990 | Tartaglia et al. | ......... 137/625.3 |
| 5,373,523 A | * | 12/1994 | Fujimoto et al. | ............. 372/58 |
| 5,528,618 A | * | 6/1996 | Schlie et al. | ................. 372/58 |
| 6,580,742 B1 | * | 6/2003 | Hayashikawa et al. | ....... 372/58 |

FOREIGN PATENT DOCUMENTS

| DE | 39 16007 | | 11/1990 |
| DE | 100 50 603 A1 | | 4/2001 |
| DE | 10050603 A1 | * | 4/2001 |
| JP | 4-233779 | | 8/1992 |
| JP | 10-56222 | | 2/1998 |
| JP | 11-220203 | | 8/1999 |
| JP | 2000-252555 | | 9/2000 |
| JP | 2001-111140 | | 4/2001 |

* cited by examiner

*Primary Examiner*—Minsun Harvey
*Assistant Examiner*—Marcia A. Golub
(74) *Attorney, Agent, or Firm*—Wenderoth, Lind & Ponack, L.L.P.

(57) ABSTRACT

A gas laser oscillator achieving a substantial increase in laser output is provided. This gas laser oscillator includes a permeable screen plate at a position of a laser gas passage and can increase the laser output substantially by suppressing and uniformizing laser gas pulsation in a discharge tube.

6 Claims, 6 Drawing Sheets

AXIAL FLOW TYPE GAS LASER OSCILLATOR

TECHNICAL FIELD

The present invention relates to an axial-flow type gas laser oscillator, the gas of which flows along an optical axis.

BACKGROUND ART

Figure 12:
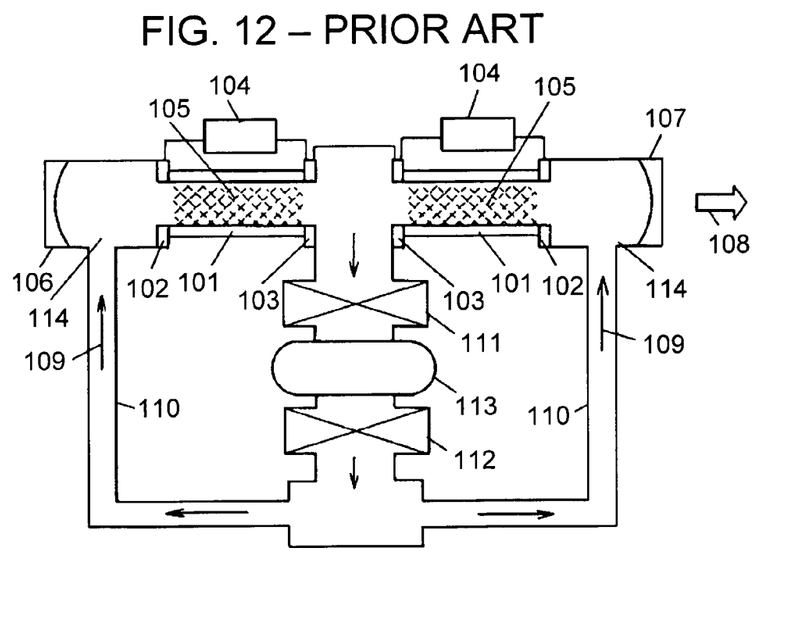
FIG. 12 schematically illustrates a conventional axial-flow type gas laser oscillator.

FIG. 12 schematically illustrates an example of a conventional axial-flow type gas laser oscillator. Referring to FIG. 12, a description is provided hereinafter of the conventional axial-flow type gas laser oscillator.

In FIG. 12, discharge tubes 101 are formed of a dielectric such as glass. Electrodes 102, 103 are provided on the periphery of discharge tube 101 and connected to power source 104. Discharge space 105 is located between electrodes 102, 103 inside discharge tube 101. Totally reflecting mirror 106 and partially reflecting mirror 107 are fixedly disposed at respective ends of discharge spaces 105 and form an optical resonator.

Laser beam 108 is output from partially reflecting mirror 107. Laser gas circulates through laser gas passage 110 of the axial-flow type gas laser oscillator and flows in direction 109. Heat exchangers 111, 112 function to lower the temperature of the laser gas that is raised by discharge in discharge space 105 and operation of blower 113. Blower 113 circulates the laser gas and produces a gas flow of about 100 m/sec in discharge space 105. Laser gas passage 110 and discharge tube 101 are connected by laser gas inlet section 114.

A description is provided next of operation of the conventional gas laser oscillator having the above structure.

The laser gas blown by blower 113 passes through laser gas passage 110 and is introduced into discharge tube 101 from laser gas inlet section 114. With the laser gas introduced into discharge tube 101, the discharge is caused in discharge space 105 by electrodes 102, 103 connected to power source 104. In discharge space 105, the laser gas is excited by obtaining this discharge energy. The optical resonator formed of totally reflecting mirror 106 and partially reflecting mirror 107 causes the excited laser gas to be in a resonant condition, and laser beam 108 is output from partially reflecting mirror 107. This laser beam 108 is used for laser beam machining or the like.

There is a conventional structure including a chamber that is provided at some position of the laser gas passage for storing the gas temporarily. This structure suppresses and uniformizes pulsation of the gas by storing the laser gas temporarily in the chamber. Such a structure is disclosed, for example, in Japanese Laid-Open Patent No. H07-142787.

Another attempt is made to damp the pulsation by providing, at some position of the laser gas passage, a resonance chamber set to include a resonance frequency of a compression wave of the laser gas and absorbing vibrational energy of the compression wave by means of a sound absorbing porous material affixed to an inner surface of the container. This structure is disclosed, for example, in Japanese Patent Unexamined Publication No. H02-285686.

The above-described conventional axial-flow type gas laser oscillator, however, has the following problem.

It is desirable that the laser gas should flow stably in discharge tube 101 of the axial gas laser. The stable gas flow stabilizes the condition of the discharge, whereby laser output can be taken efficiently with respect to electrical input to discharge tube 101. If the laser gas flow has the pulsation, such as a pressure change of about tens to hundreds of hertz over time, the condition of the discharge becomes unstable. Consequently, the laser output is reduced.

The axial-flow type gas laser oscillator structurally requires blower 113. An impeller of blower 113 is rotated generally at hundreds of hertz to blow the laser gas. For this reason, the gas flow problematically has the pulsation or the compression wave that synchronizes with the impeller's rotation at hundreds of hertz.

To address this problem, the above-mentioned structure has the chamber that is provided at some position of the laser gas passage for storing the gas temporarily. This structure attempts to suppress and uniformize the pulsation of the gas by storing the laser gas temporarily in the chamber. Although this structure can reduce the pulsation to some extent, the structure is not sufficiently effective in improving the decline in laser output.

The attempt, which is made to damp the pulsation by providing, at some position of the laser gas passage, the resonance chamber set to include the resonance frequency of the compression wave of the laser gas and absorbing the vibrational energy of the compression wave by means of the sound absorbing porous material affixed to the inner surface of the container, is also not sufficiently effective in improving the decline in laser output.

DISCLOSURE OF THE INVENTION

A gas laser oscillator includes:
a discharge tube for exciting laser gas;
a laser gas passage connected to the discharge tube;
laser gas circulation means for circulating the laser gas in the laser gas passage as well as in the discharge tube; and
a permeable screen plate provided at a position of the laser gas passage.

DETAILED DESCRIPTION OF THE PREFERRED EMBODIMENTS

The present invention addresses the above-mentioned problem of the conventional gas laser oscillator and aims to achieve a substantial increase in laser output.

Referring to the accompanying drawings, a description is provided hereinafter of an exemplary embodiment of the present invention.

Figure 1:
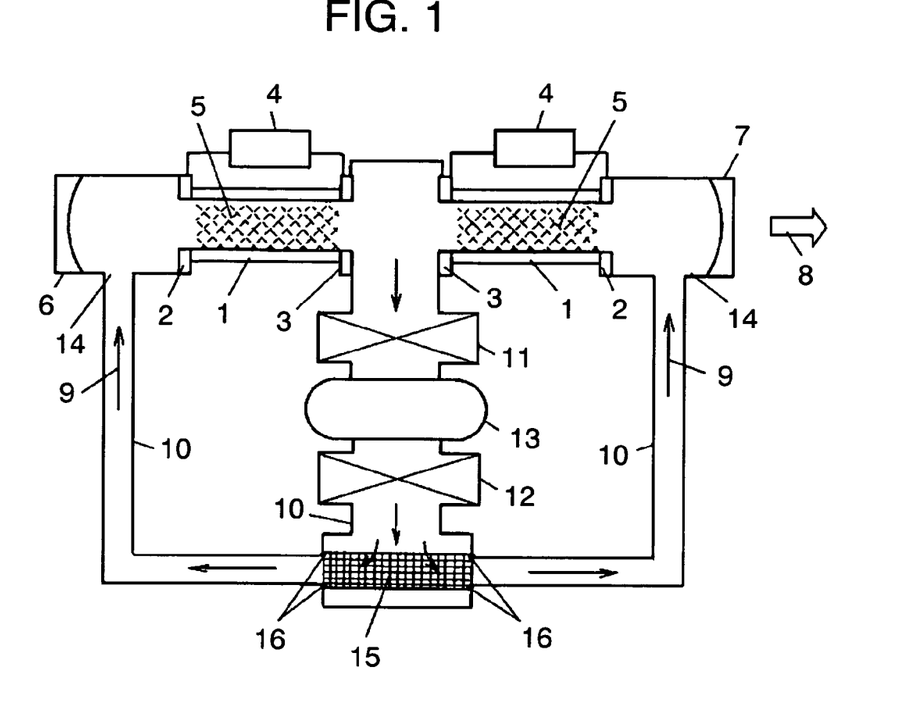
FIG. 1 illustrates a gas laser oscillator in accordance with an exemplary embodiment of the present invention.

FIG. 1 illustrates a gas laser oscillator of the present embodiment. In FIG. 1, discharge tubes 1 are formed of a dielectric such as glass. Electrodes 2, 3 are provided on the periphery of discharge tube 1 and connected to power source 4. Discharge space 5 is formed inside discharge tube 1 sandwiched between electrodes 2, 3. Totally reflecting mirror 6 and partially reflecting mirror 7 are fixedly disposed at respective ends of discharge spaces 5 and form an optical resonator.

Laser beam 8 is output from partially reflecting mirror 7. Laser gas circulates through the axial-flow type gas laser oscillator and flows in direction 9. Heat exchangers 11, 12 function to lower the temperature of the laser gas that is raised by discharge in discharge space 5 and operation of blower 13. Blower 13 serving as laser gas circulation means circulates the laser gas and produces a gas flow of about 100 m/sec in discharge space 5. Laser gas passage 10 and discharge tube 1 are connected by laser gas inlet section 14. It is to be noted that blower 13 is an example of the laser gas circulation means for circulating the laser gas.

The present embodiment has the following points. Meshed screen plate 15 is provided on a downstream side of blower 13 to block laser gas passage 10 through which the laser gas flows in direction 9, and screen plate 15 and laser gas passage 10 are connected by seal parts 16, each of which is formed of an elastic member. It is to be noted that meshed screen plate 15 is an example of a permeable screen plate. Another example of the permeable screen plate is described later. Since seal parts 16 used are formed of the elastic members, screen plate 15 is joined to laser gas passage 10 by the elastic members.

A description is provided next of operation of the gas laser oscillator. The laser gas blown by blower 13 passes through meshed screen plate 15, passes through laser gas passage 10 and is then introduced into discharge tube 1 from laser gas inlet section 14. With the laser gas introduced into discharge tube 1, electrodes 2, 3 connected to power source 4 cause the discharge in discharge space 5. In discharge space 5, the laser gas is excited by obtaining this discharge energy. The optical resonator formed of totally reflecting mirror 6 and partially reflecting mirror 7 causes the excited laser gas to be in a resonant condition, and laser beam 8 is output from partially reflecting mirror 7. This laser beam 8 is used for laser beam machining or the like.

Figure 2:
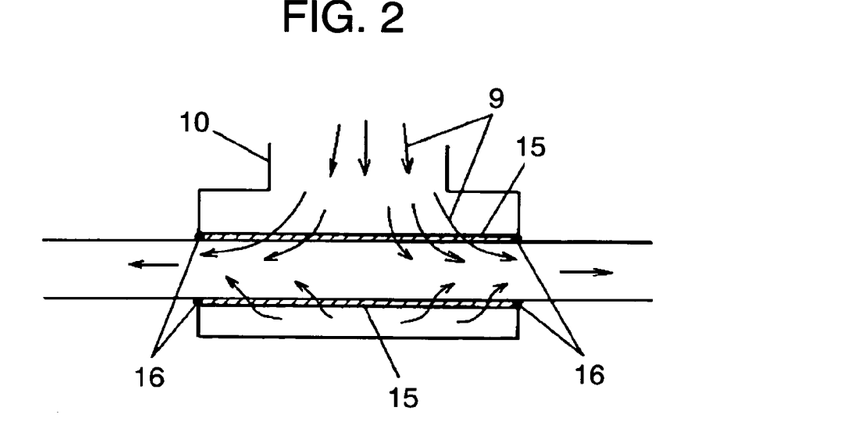
FIG. 2 is a detailed view of meshes of a screen plate in accordance with the embodiment of the invention.

FIG. 2 is a detailed view of meshes of the screen plate. In the drawing, the laser gas flows in direction 9.

Pulsation of the laser gas flow or amplitude of a compression wave in the laser gas correlates with an aerodynamic characteristic defined by mass flow rate Q (m³/min) of the laser gas and pressure P (Pa) of the laser gas. Accordingly, it is preferable that the product of mass flow rate Q (m³/min) and pressure P (Pa) of the laser gas falls within a range expressed by:

$$6.0 \times 10^4 \ Pa \cdot m^3/min < Q \times P < 1.5 \times 10^6 \ Pa^* m^3/min \tag{1}$$

Figure 3:
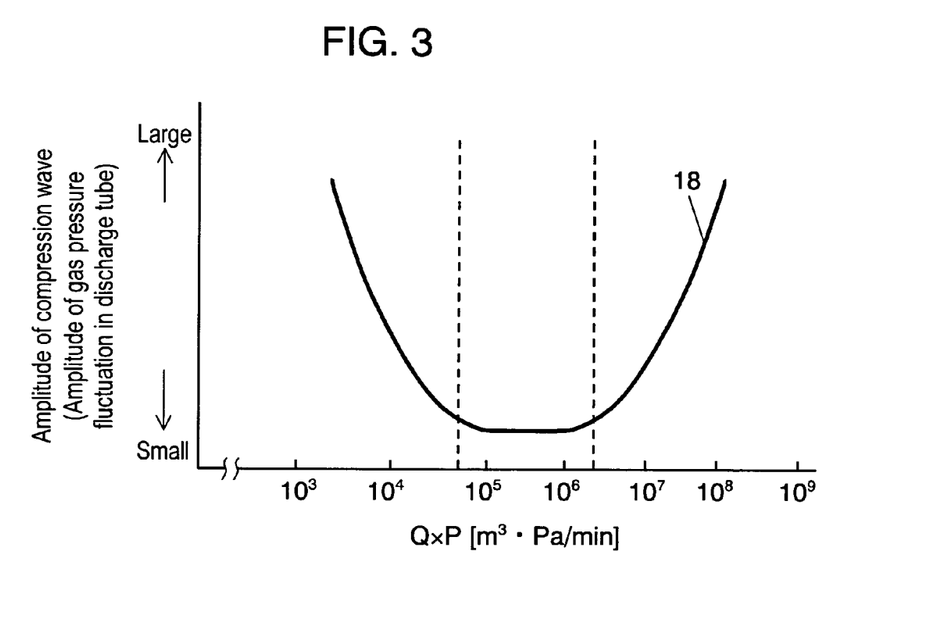
FIG. 3 shows a correlation between the product of mass flow rate Q and laser gas pressure P and amplitude of a compression wave of laser gas which has passed through the meshed screen plate in accordance with the embodiment of the invention.

FIG. 3 shows a correlation between the product of mass flow rate Q (m³/min) and laser gas pressure P (Pa) and the amplitude of the compression wave of the laser gas which has passed through meshed screen plate 15. A horizontal axis represents the product (Q×P) of Q (m³/min) and P (Pa), while a vertical axis represents the amplitude of the compression wave. Curve 18 represents the relationship between the product (Q×P) and the amplitude of the compression wave. As is clear from FIG. 3, in cases where inequality (1) is satisfied, the compression wave has small amplitude, and the laser gas flow has a small pulsation.

Due to, for example, the mass flow rate of the laser gas, the pressure of the gas, density of the gas, the structure of a circulation path or the structure of the blower, the compression wave with certain wavelength λ (mm) is formed in the laser gas. In a general gas laser oscillator, mass flow rate Q (m³/min) of the laser gas is about 10 to 50 m³/min, laser gas pressure P (Pa) is about 6 to 30 kPa, and wavelength λ of the compression wave is about tens to hundreds of millimeters.

When above-mentioned wavelength λ (mm) of the compression wave satisfies the following inequality (2) with an inside diameter of laser gas passage 10 being D (mm) in the vicinity of meshed screen plate 15, the pulsation of the laser gas flow can be suppressed.

$$D/\lambda < 10 \tag{2}$$

Figure 4:
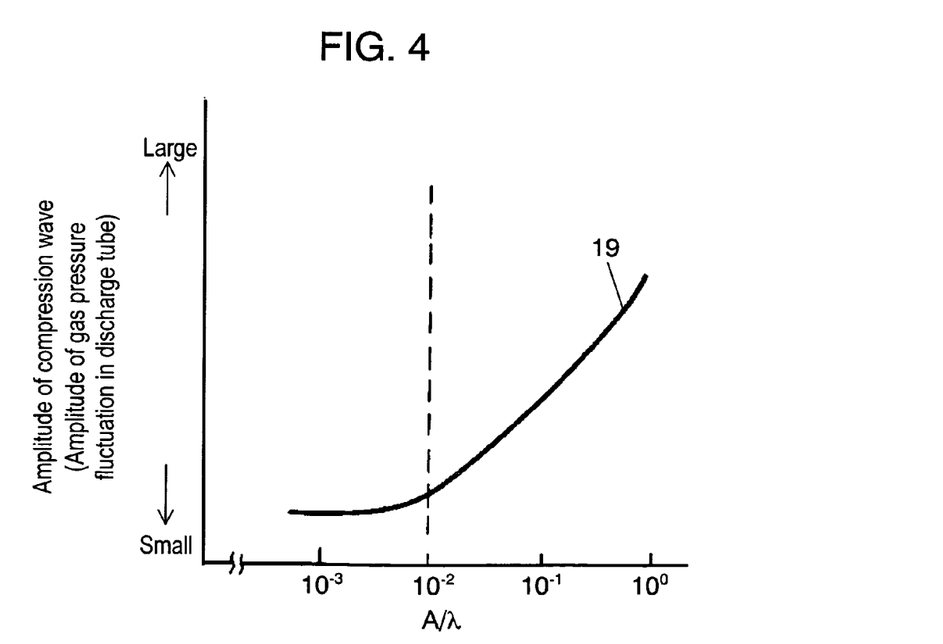
FIG. 4 shows a correlation between a ratio of mesh diameter A of the screen plate to wavelength λ of the compression wave and the amplitude of the compression wave of the laser gas which has passed through the meshed screen plate in accordance with the embodiment of the invention.

FIG. 4 shows a correlation between a ratio of diameter A (mm) of the mesh of screen plate 15 to wavelength λ (mm) of the compression wave and the amplitude of the compression wave of the laser gas which has passed through the meshed screen plate. A horizontal axis represents the ratio (A/λ) of mesh diameter A (mm) to wavelength λ (mm) of the compression wave, while a vertical axis represents the amplitude of the compression wave. Curve 19 represents the relationship between the ratio (A/λ) and the amplitude of the compression wave. As is clear from FIG. 4, it is preferable that mesh diameter A (mm) of screen plate 15 satisfies the following inequality (3) with respect to wavelength λ(mm) of the compression wave.

$$A/\lambda < 10^{-2} \tag{3}$$

Figure 5:
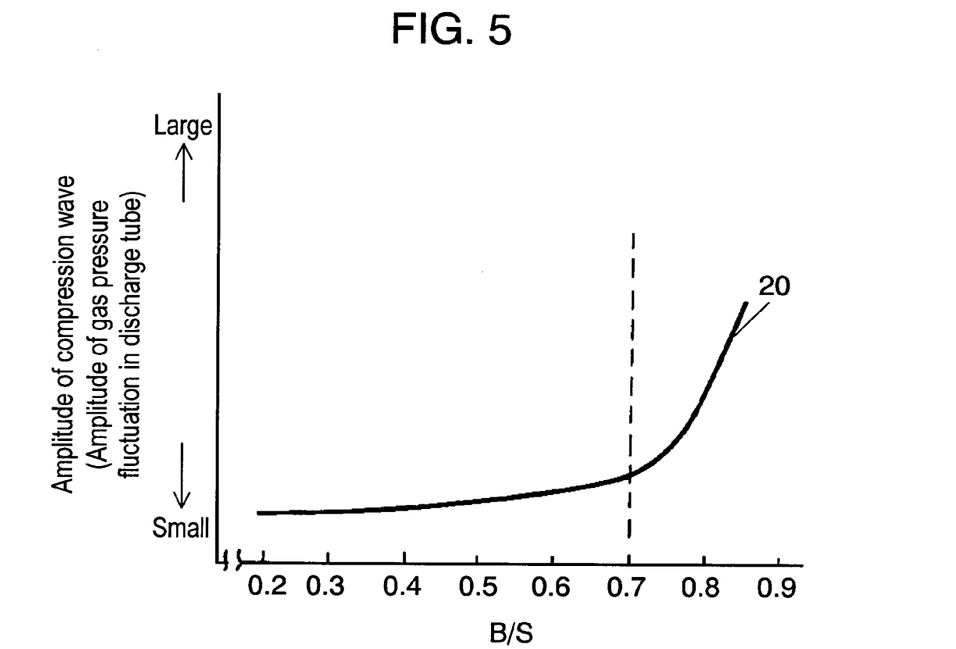
FIG. 5 shows a correlation between a ratio of total mesh area B to total sectional area S of the meshed screen plate and the amplitude of the compression wave of the laser gas which has passed through the meshed screen plate in accordance with the embodiment of the invention.

When screen plate 15 has total sectional area S (mm²) and total mesh area B (mm²), FIG. 5 shows a correlation between a ratio (B/S) of total mesh area B (mm²) to total sectional area S (mm²) and the amplitude of the compression wave of the laser gas which has passed through the meshed screen plate. In FIG. 5, a horizontal axis represents the ratio (B/S) of total mesh area B (mm²) to total sectional area S (mm²), while a vertical axis represents the amplitude of the compression wave of the laser gas. Curve 20 represents the relationship between the ratio (B/S) and the amplitude of the compression wave of the laser gas.

Figure 6:
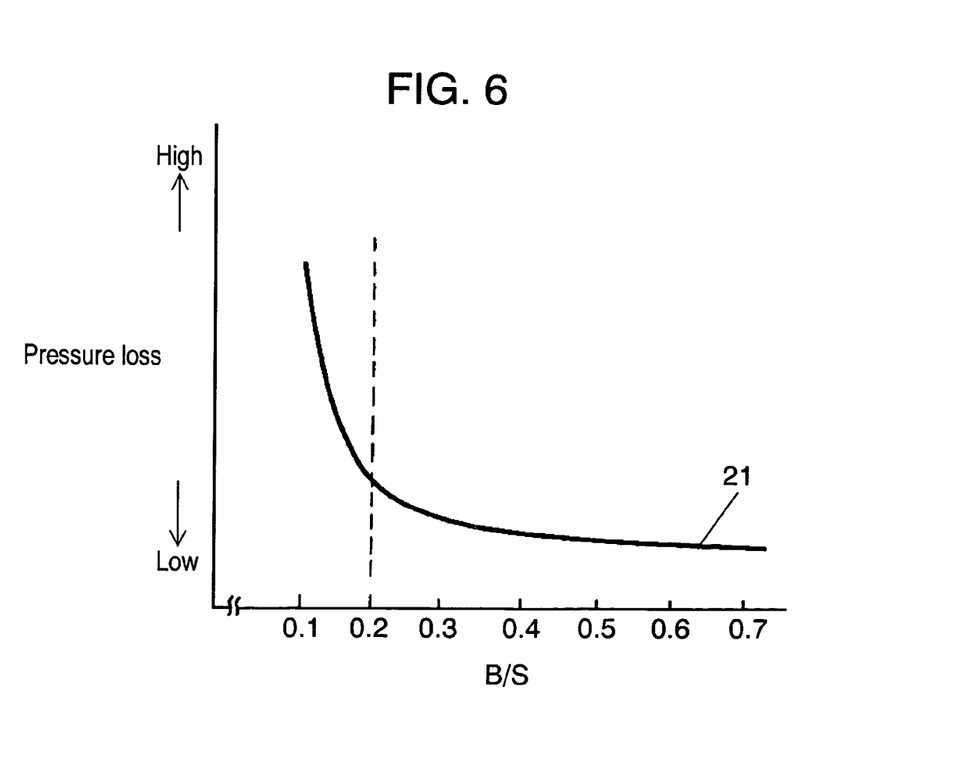
FIG. 6 shows a correlation between the ratio of total mesh area B to total sectional area S of the meshed screen plate and a pressure loss of the laser gas passing through the meshed screen plate in accordance with the embodiment of the invention.

FIG. 6 shows a correlation between the ratio (B/S) of total mesh area B (mm²) to total sectional area S (mm²) and a pressure loss of the laser gas passing through the meshed screen plate. In FIG. 6, a horizontal axis represents the ratio (B/S) of total mesh area B (mm²) to total sectional area S (mm²), while a vertical axis represents the pressure loss of the laser gas. Curve 21 represents the relationship between the ratio (B/S) and the pressure loss of the laser gas.

It is to be noted that total sectional area S (mm²) is an area defined from outer dimensions of the screen plate and includes the meshes and an area not including the meshes, while total mesh area B (mm²) is the total sectional area of only the meshes of the screen plate. The pressure loss of the laser gas corresponds to a drop in the pressure of the lasers gas passing through the screen plate.

In the present embodiment, the following inequality (4) is satisfied.

$$0.2 < B/S < 0.7 \quad (4)$$

A description is provided next of the operation of the present embodiment.

The laser gas blown by blower 13 passes through laser gas passage 10 and reaches meshed screen plate 15. This laser gas blown by blower 13 is attended with the pulsation having a certain cycle corresponding to rotation of an impeller of blower 13, so that the compression wave having the certain wavelength and amplitude is formed.

When the laser gas passes through the meshes of screen plate 15 shown in FIG. 2, the wavelength and amplitude of the compression wave change substantially. The compression wave has an extremely shorter wavelength and extremely smaller amplitude than those before passage through the meshed screen plate, so that pressure fluctuation of the laser gas is uniformized. This effect is demonstrated by FIG. 3 where as described earlier, when the dynamic characteristic of the laser gas that is expressed by the product of mass flow rate Q (m³/min) and pressure P (Pa) of the laser gas falls within the certain range or satisfies inequality (1), the compression wave has the small amplitude, and the laser gas flow has the small pulsation.

In cases where an extremely small amount of laser gas passes through the meshed screen plate per unit time, that is, when $Q \times P \leq 6.0 \times 10^4 \text{Pa} \cdot \text{m}^3/\text{min}$, the compression wave increases in amplitude as shown in FIG. 3. The reason is that the compression wave presumably passes without being much disturbed when the wave crashes against meshed screen plate 15.

Even in cases where an extremely large amount of laser gas passes through the meshed screen plate per unit time, that is, when $1.5 \times 10^6 \text{ Pa} \cdot \text{m}^3/\text{min} \leq Q \times P$, the compression wave increases in amplitude as shown in FIG. 3. The reason is that the collision between the compression wave and the meshed screen plate presumably causes another oscillatory wave, thus reducing the effect of uniformizing the pressure fluctuation of the laser gas.

As shown in FIG. 4, mesh diameter A (mm) of screen plate 15 must be sufficiently small with respect to wavelength λ (mm) of the compression wave. Simply allowing passage through meshed screen plate 15 is presumably less effective in damping the compression wave. As shown in FIG. 4, the correlation between the ratio (A/λ) of mesh diameter A (mm) of the screen plate to wavelength λ (mm) of the compression wave and the amplitude of the compression wave of the laser gas which has passed through the meshed screen plate or the amplitude of the gas pressure fluctuation in the discharge tube is preferable when inequality (3) is satisfied.

It is a critical value determined by experiment. Theoretically, it presumably correlates with a fact that the laser gas flow approaches a region where it behaves as molecular flow, not as viscous flow. Presumably, a characteristic of the long-wavelength, large-amplitude compression wave is once lost when the compression wave passes through the meshed screen plate, and a new short-wavelength, small-amplitude compression wave is formed after passage through the meshed screen plate. The wavelength and amplitude of the newly formed compression wave are much shorter and smaller than those before passage through the meshed screen plate, so that the pressure fluctuates extremely less when viewed macroscopically.

It is to be noted here that the ratio (A/λ) presumably correlates with the product (Q×P) mentioned earlier, and hence is not determined arbitrarily.

Although it has been determined by experiment, it is presumable that it is theoretically a critical value defined from the relationship between kinetic energy and viscosity of the fluid that is normally expressed by a Reynolds number.

To render the above-mentioned mechanism effective, a thread of the mesh needs to have some width. If the thread of the mesh is too thin, the compression wave in the laser gas passes through the meshed screen plate in a virtually unaffected form. As is clear from FIG. 5 showing the correlation between the ratio (B/S) and the amplitude of the compression wave of the laser gas, which has passed through the meshed screen plate, or the amplitude of the gas pressure fluctuation in the discharge tube, a critical value determined by a field test is expressed by the following inequality (5).

$$B/S < 0.7 \quad (5)$$

If the thread of the mesh is too thick, this raises concern about the pressure loss of the laser gas passing through the meshed screen plate. If the pressure loss is high, a flow characteristic of the blower degrades, so that the mass flow rate of the laser gas flowing through the discharge tube reduces. Consequently, the laser output reduces. This is mistaking the means for the end. As is clear from FIG. 6 showing the correlation between the ratio (B/S) and the pressure loss of the laser gas passing through the meshed screen plate, a critical value defined based on the pressure loss is expressed by the following inequality (6).

$$0.2 < B/S \quad (6)$$

Since the laser gas is introduced into discharge tube 1 with the pulsation eliminated, the condition of the discharge stabilizes, and the laser output increases.

Figure 7:
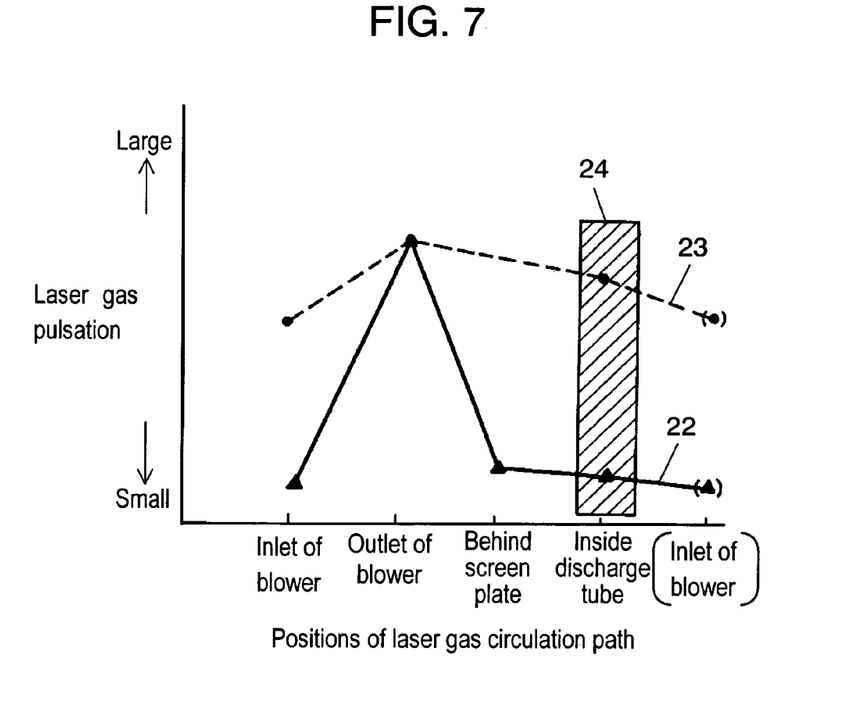
FIG. 7 shows gas pressure pulsation at each position of a laser gas circulation path of the invention's embodiment and gas pressure pulsation at each position of a laser gas circulation path of a conventional example.

FIG. 7 shows the gas pressure pulsation at each position of the laser gas circulation path of the invention's embodiment and the gas pressure pulsation at each position of a laser gas circulation path of a conventional example. In FIG. 7, a horizontal axis represents the positions of the laser gas circulation path, while a vertical axis represents the laser gas pulsation. Solid line 22 represents a characteristic of the present embodiment, and broken line 23 represents a characteristic of the conventional example. Diagonally shaded area 24 corresponds to the interior of discharge tube 1 in the laser gas circulation path. As is clear from comparison between solid line 22 and broken line 23 in area 24, the present embodiment has the gas pressure pulsation reduced by meshed screen plate 15 and has remarkably stable gas pressure compared to that of the conventional example.

Figure 8:
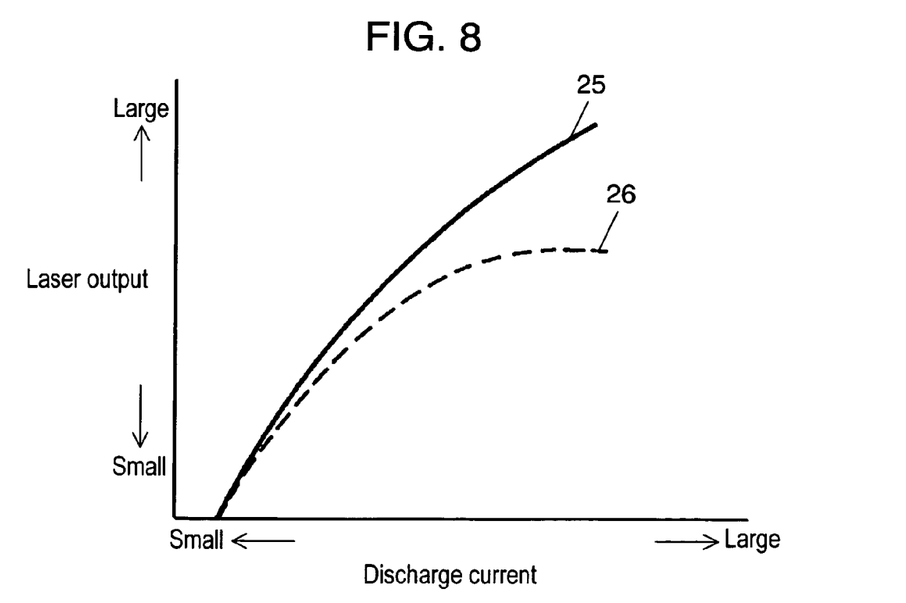
FIG. 8 provides a comparison of respective laser outputs of the invention's embodiment and the conventional example.

FIG. 8 provides a comparison of respective laser outputs of this embodiment and the conventional example. In FIG. 8, a horizontal axis represents discharge current, while a vertical axis represents the laser output. Solid line 25 represents a characteristic of the present embodiment, and broken line 26 represents a characteristic of the conventional example. As is clear from solid line 25 and broken line 26, the present embodiment achieves a substantial increase in laser output compared to the conventional example.

Providing seal parts 16 where the elastic members such as rubber members join meshed screen plate 15 to laser gas passage 10 can suppress vibration of screen plate 15 during passage of the laser gas. In other words, meshed screen plate 15 can be restrained from vibrating by having seal parts 16 where the elastic members such as the rubber members join screen plate 15 to laser gas passage 10. Accordingly, the above-mentioned advantages are enhanced. This is described with reference to FIGS. 9 and 10.

Figure 9:
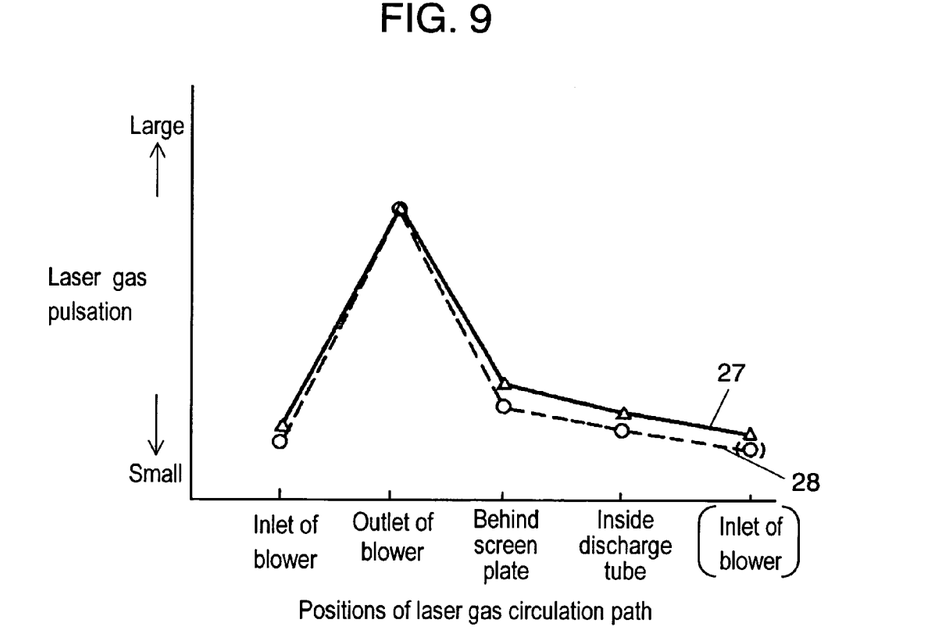
FIG. 9 shows gas pressure pulsation at each position of the laser gas circulation path in accordance with the embodiment of the invention.

In FIG. 9, a vertical axis represents the same one as that of FIG. 7, and a horizontal axis represents the same one as that of FIG. 7. Solid line 27 represents a characteristic when meshed screen plate 15 is fixed directly to laser gas passage 10 without seal parts 16. Broken line 28 represents a characteristic when screen plate 15 is joined to passage 10 by seal parts 16 each formed of the elastic member such as the rubber member. As is clear from solid line 27 and broken line 28, the connection using seal parts 16 formed of the elastic members reduces the laser gas pulsation.

Figure 10:
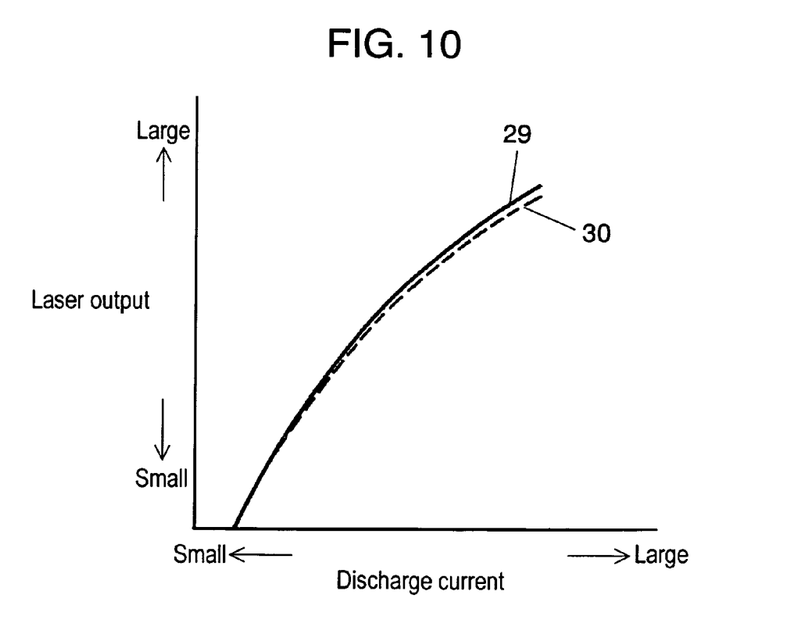
FIG. 10 provides a comparison of laser outputs in accordance with the embodiment of the invention.

In FIG. 10, a vertical axis represents the same one as that of FIG. 8, and a horizontal axis represents the same one as that of FIG. 8. Broken line 30 represents a characteristic when meshed screen plate 15 is fixed directly to laser gas passage 10 without seal parts 16. Solid line 29 represents a characteristic when meshed screen plate 15 is joined to laser gas passage 10 by seal parts 16 each formed of the elastic member such as the rubber member. As is clear from solid line 29 and broken line 30, the connection using seal parts 16 formed of the elastic members increases the laser output.

As described above, suppressing and uniformizing the laser gas pulsation in the discharge tube can increase the laser output substantially.

Figure 11:
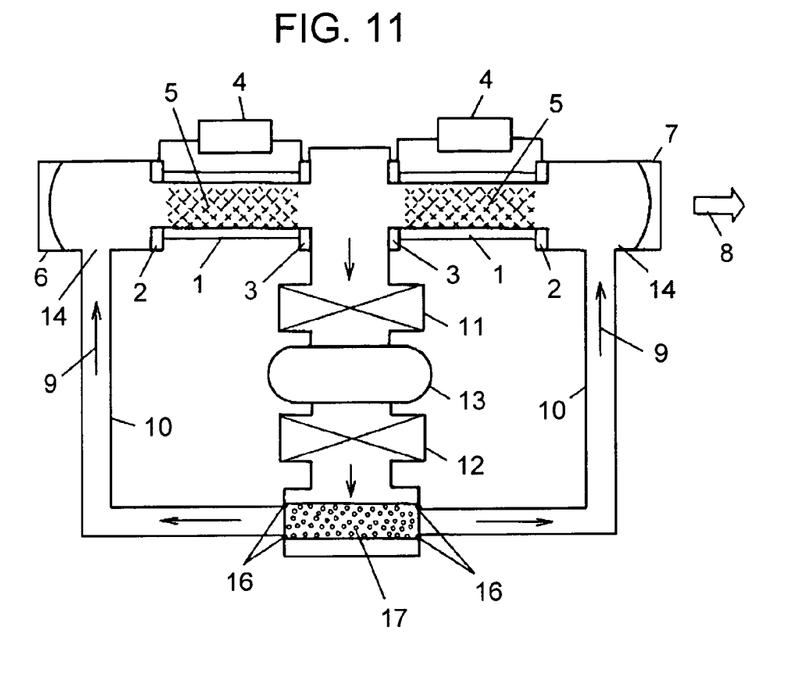
FIG. 11 illustrates another gas laser oscillator in accordance with the embodiment of the invention.

The above description of the embodiment has referred to cases where meshed screen plate 15 is used as the permeable screen plate. However, the present invention is not limited to meshed screen plate 15. The same advantages can be obtained even when a screen plate having a plurality of holes is used as the permeable screen plate. Referring to FIG. 11, a description is provided hereinafter of the embodiment using the screen plate with the plurality of holes.

FIG. 11 illustrates a gas laser oscillator. Elements similar to those in FIG. 1 have the same reference marks, and the detailed descriptions of those elements are omitted. Screen plate 17 differs from meshed screen plate 15 in that this plate 17 has the plurality of holes each having a diameter of about 40 to 100 μm.

This screen plate 17 with the plurality of holes is as effective as meshed screen plate 15 described above. In other words, this plate 17 has the same characteristics as those illustrated by FIGS. 3-10, and the same inequalities as inequalities (1)–(6) are obtained. It is to be noted that in the case of FIG. 11, variable A in inequality (3) is a numeric value expressing the diameter of the hole in millimeters. The laser gas pulsation in the discharge tube is thus suppressed and uniformized, whereby the laser output can be increased substantially.

The present invention includes the meshed screen plate or the screen plate with the plurality of holes at the position of the laser gas passage. The screen plate functions to block the laser gas flowing through the laser gas passage. Accordingly, the wavelength and amplitude of the compression wave of the laser gas become shorter and smaller. Consequently, the laser gas pulsation is suppressed in the discharge tube, and the pressure fluctuation of the laser gas is uniformized.

The description has also referred to joining the screen plate to the laser gas passage by means of seal parts 16 each formed of the elastic member. With the use of the elastic member, the vibration of the screen plate can be suppressed.

As is clear from the above description, the laser oscillator of the present invention can achieve the substantial increase in laser output by suppressing and furthering uniformization of the laser gas pulsation in the discharge tube.

INDUSTRIAL APPLICABILITY

A gas laser oscillator of the present invention can suppress and further uniformization of laser gas pulsation in a discharge tube. In this way, a substantial increase in laser output is achieved.

The invention claimed is:

1. A gas laser oscillator comprising:
   a discharge tube for exciting laser gas;
   a laser gas passage connected to said discharge tube;
   a laser gas circulator for circulating the laser gas in said laser gas passage as well as in said discharge tube; and
   a permeable screen plate provided at a position of said laser gas passage;
   wherein said laser gas circulator is provided at a position of said laser gas passage;
   wherein said screen plate is provided between said laser gas circulator means and said discharge tube;
   wherein said screen plate is meshed; and
   wherein the following inequalities are satisfied:

$6.0 \times 10^4 \text{ Pa} \cdot \text{m}^3/\text{min} < Q \times P < 1.5 \times 10^6 \text{ Pa} \cdot \text{m}^3/\text{min}$ $D/\lambda < 10$ $A/\lambda < 10^{-2}$ $0.2 < B/S < 0.7$ where Q (m³/min) is a mass flow rate of the laser gas, P (Pa) is a pressure of the laser gas, λ(mm) is a wavelength of a compression wave in the laser gas that results from pressure fluctuation, D (mm) is an inside diameter of said laser gas passage in the vicinity of said screen plate, A (mm) is a mesh diameter of said screen plate, S (mm²) is a total sectional area of said screen plate, and B (mm²) is a total mesh area of said screen plate.

2. A gas laser oscillator comprising:
   a discharge tube for exciting laser gas;
   a laser gas passage connected to said discharge tube;
   a laser gas circulator for circulating the laser gas in said laser gas passage as well as in said discharge tube; and
   a permeable screen plate provided at a position of said laser gas passage;
   wherein said laser gas circulator is provided at a position of said laser gas passage;
   wherein said screen plate is provided between said laser gas circulator and said discharge tube;
   wherein said screen plate includes a plurality of holes; and
   wherein the following inequalities are satisfied:

$6.0 \times 10^4 \text{ Pa} \cdot \text{m}^3/\text{min} < Q \times P < 1.5 \times 10^6 \text{ Pa} \cdot \text{m}^3/\text{min}$ $D/\lambda < 10$ $A/\lambda < 10^{-2}$ $0.2 < B/S < 0.7$ where Q (m³/min) is a mass flow rate of the laser gas, P (Pa) is a pressure of the laser gas, λ(mm) is a wavelength of a compression wave in the laser gas that results from pressure fluctuation, D (mm) is an inside diameter of said laser gas passage in the vicinity of said screen plate, A (mm) is a diameter of each of said holes, S (mm²) is a total sectional area of said screen plate, and B (mm²) is a total hole area of said screen plate.

3. The gas laser oscillator of claim 1, wherein said screen plate is joined to said laser gas passage by an elastic member.

4. The gas laser oscillator of claim 1, wherein said laser gas circulator is formed of a blower.

5. The gas laser oscillator of claim 2, wherein said screen plate is joined to said laser gas passage by an elastic member.

6. The gas laser oscillator of claim 2, wherein said laser gas circulator is formed of a blower.

* * * * *